US011753251B1

(12) United States Patent
Bootz

(10) Patent No.: US 11,753,251 B1
(45) Date of Patent: Sep. 12, 2023

(54) CONVEYOR END DRIVE WITH WEIGHTED TAKE-UP ROLLER

(71) Applicant: Dorner Mfg. Corp., Hartland, WI (US)

(72) Inventor: Joshua Bootz, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 17/697,269

(22) Filed: Mar. 17, 2022

(51) Int. Cl.
*B65G 23/44* (2006.01)

(52) U.S. Cl.
CPC .................... *B65G 23/44* (2013.01)

(58) Field of Classification Search
CPC ...................................................... B65G 23/44
USPC .................................................. 198/813, 815
See application file for complete search history.

(56) References Cited

U.S. PATENT DOCUMENTS

| | | | | |
|---|---|---|---|---|
| 2,633,977 A * | 4/1953 | McMillan | .............. | B65G 23/44 198/815 |
| 3,261,452 A * | 7/1966 | Thomson | .............. | B65G 23/44 198/833 |
| 3,275,126 A * | 9/1966 | Hartzell, Jr. | .......... | B65G 23/44 474/138 |
| 3,753,488 A * | 8/1973 | Wilson | .................. | B65G 23/44 187/404 |
| 4,033,451 A * | 7/1977 | Kelsall | ................... | B65G 23/44 198/815 |
| 4,378,875 A * | 4/1983 | Allan | ..................... | B65G 17/02 198/833 |
| 6,394,261 B1 * | 5/2002 | DeGennaro | ........... | B65G 21/18 198/815 |
| 6,971,509 B2 | 12/2005 | Ertel et al. | | |
| 7,383,944 B2 | 6/2008 | Hall et al. | | |
| 7,874,419 B2 | 1/2011 | Hosch et al. | | |
| 8,936,147 B2 | 1/2015 | Knas et al. | | |

FOREIGN PATENT DOCUMENTS

| | | | | |
|---|---|---|---|---|
| CN | 102295141 A | * | 12/2011 | ............. B65G 24/44 |
| CN | 107804675 A | * | 3/2018 | ............. B65G 23/44 |

* cited by examiner

*Primary Examiner* — James R Bidwell
(74) *Attorney, Agent, or Firm* — ANDRUS INTELLECTUAL PROPERTY LAW, LLP

(57) ABSTRACT

A conveyor assembly for a continuous belt conveyor. The conveyor assembly includes a drive assembly and a belt tensioner that are both mounted to one end of the conveyor assembly. The belt tensioner includes a housing that surrounds a catenary sag portion of an endless conveyor belt. A weighted tension roller is positioned in contact with the conveyor belt in the catenary sag portion to exert tension onto the conveyor belt due to gravity. The tension roller includes a main body and a pair of weight plates that increase the overall weight of the tension roller. The housing of the belt tensioner includes a pair of guide slots that guide the vertical movement of the tension roller. A stationary ratchet plate and a movable ratchet member restrict the direction of vertical movement of the tension roller in the pair of guide slots.

15 Claims, 10 Drawing Sheets

CONVEYOR END DRIVE WITH WEIGHTED TAKE-UP ROLLER

BACKGROUND

The present disclosure relates to a conveyor assembly having an end drive for moving an endless conveyor belt. More specifically, the present disclosure relates to a conveyor assembly that includes catenary sag after the end drive assembly and includes a tension roller for tensioning the conveyor belt at a first end of the conveyor frame.

Known construction of an endless belt conveyor typically includes a conveyor frame assembly, a drive roller located at one end of the conveyor frame and a conveyor belt engaged around the drive motor. In such conveyors, systems must be used to maintain tension in the conveyor belt to compensate for stretching that naturally occurs during a lifetime of use of thee conveyor belt.

In typical conveyor assemblies, catenary sag is introduced into a lower run of the endless conveyor belt to compensate for the stretching that occurs during use. In some conveyors that include an end drive, a catenary section of the conveyor belt is located at the end of the conveyor frame immediately after the drive roller. Although this type of system functions to compensate for the belt stretching, the catenary sag introduces noise, chain pulsing and other problems.

In other conveyor assemblies, the catenary sag is introduced into a center portion of the conveyor frame between the first and second ends of the conveyor frame. A take up assembly is mounted at the center of the conveyor frame and includes rollers that allow the lower run of the conveyor belt to pass over the rollers. The rollers can be adjusted to introduce tension into the conveyor belt. However, this type of system introduces additional rollers and another module mounted near the center of the conveyor frame.

The present inventors have recognized the drawbacks with currently available modules that introduce tension into an endless conveyor belt that includes a catenary sag section and have developed the present disclosure to address these issues by reducing the number of parts and positioning the tensioning assembly at the end of the conveyor frame including the drive motor and drive roller.

SUMMARY

The present disclosure relates to a conveyor assembly for use with an endless belt. More specifically, the present disclosure relates to a conveyor assembly that includes both a drive assembly and a catenary sag belt tensioner mounted to one end of the conveyor assembly.

The conveyor assembly of the present disclosure includes a conveyor frame that extends between a first end and a second end. The conveyor frame supports an endless conveyor belt that has an upper run and a lower run. In one embodiment, the conveyor belt is formed from a series of joined individual plastic links, although other conveyor belt constructions are contemplated.

The conveyor belt passes over a drive roller located at the first end of the conveyor frame. The drive roller is operatively connected to a drive motor also located at the first end of the conveyor frame. The conveyor belt includes a catenary sag portion that is located after the drive roller. The catenary sag portion of the conveyor belt is thus located at the first end of the conveyor assembly.

The conveyor assembly includes a belt tensioner located at the first end of the conveyor assembly. The belt tensioner includes a tension roller that is positioned in the catenary sag of the conveyor belt. The tension roller is freely movable in a vertical direction such that the overall weight of the tension roller exerts a tension force on the conveyor belt due to gravity. In one exemplary embodiment, the tension roller includes a pair of weight plates that are sized and selected to increase the overall weight of the tension roller.

The belt tensioner further includes a guide roller that receives the conveyor belt after the conveyor belt moves out of contact with the tension roller. The guide roller guides the conveyor belt back into contact with the conveyor frame.

The belt tensioner includes a pair of side mounting plates that support both the tension roller and the guide roller. The mounting plates each include a guide slot that is positioned to guide the vertical movement of the tension roller as the conveyor belt stretches. The guide slots prevent rotation of a portion of the tension roller while allowing for vertical movement. In one contemplated embodiment, the belt tensioner includes a ratchet assembly that has a stationary ratchet plate and a movable ratchet member. The ratchet assembly allows for vertical movement of the tension roller in only one direction while preventing movement in an opposite direction.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
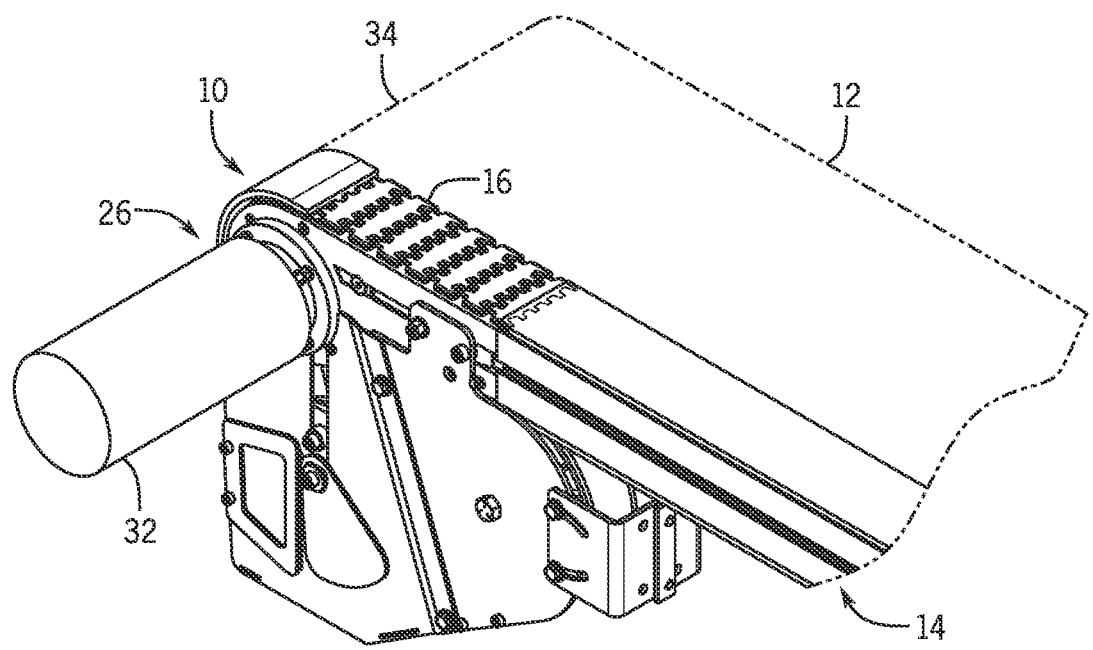
FIG. 1 is a perspective view of a conveyor assembly of the present disclosure.
Figure 2:
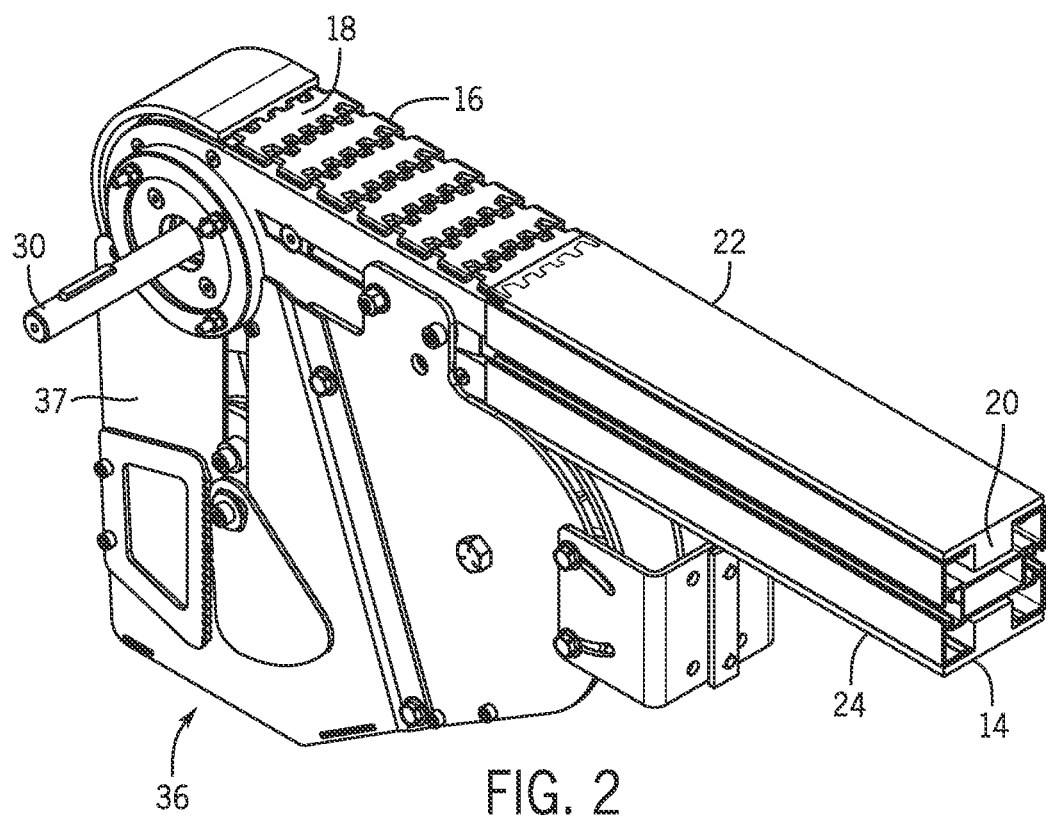
FIG. 2. is a perspective view similar to FIG. 1 with the drive motor removed.
Figure 3:
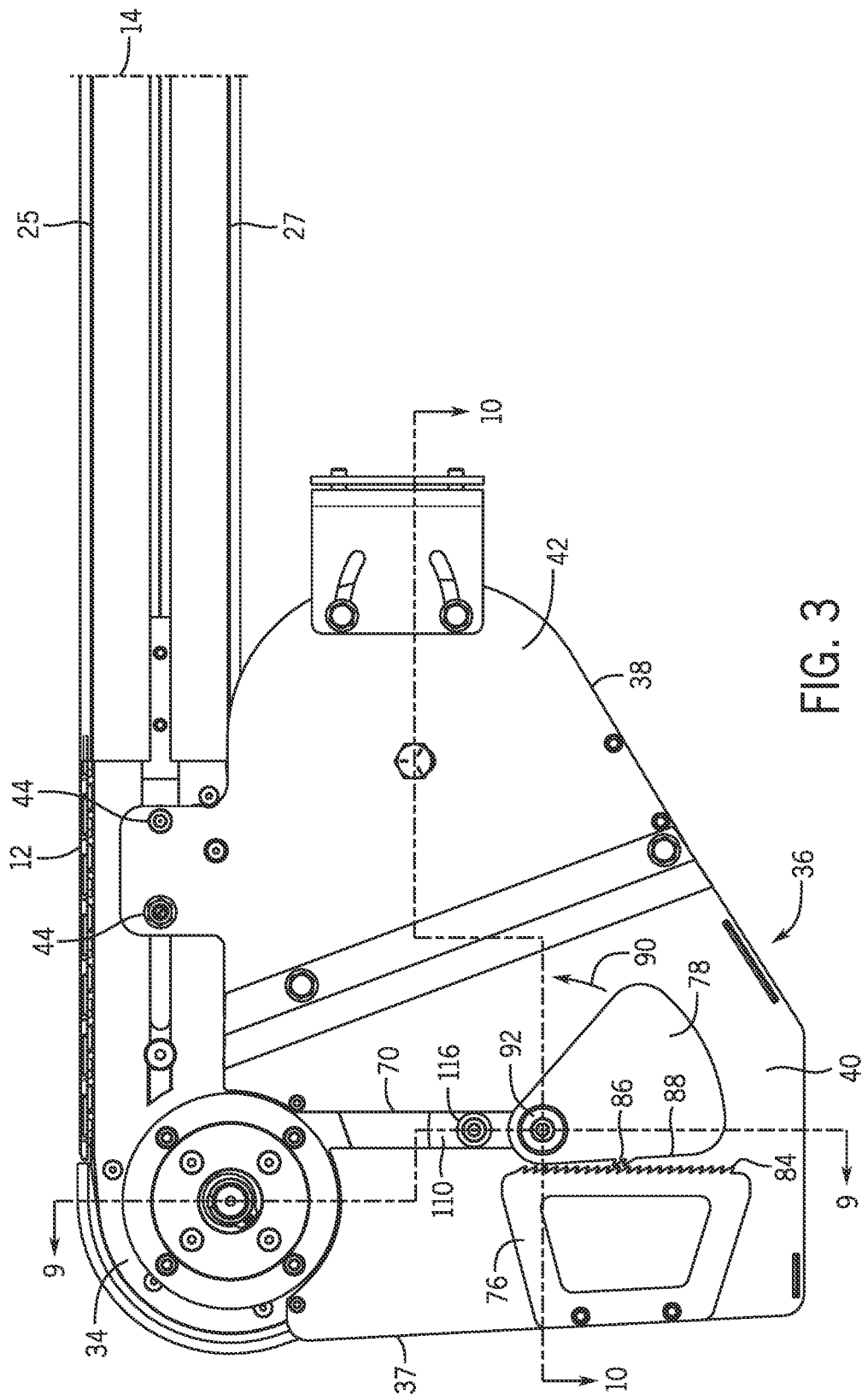
FIG. 3 is a side view of the drive assembly located at one end of the conveyor frame.

FIGS. 1-3 generally illustrate a conveyor assembly 10 constructed in accordance with the present disclosure. The conveyor assembly 10 is used to move articles or items from a first end of the conveyor assembly to a second end of the conveyor assembly. In the embodiment shown in FIGS. 1-3, the conveyor assembly includes an endless conveyor belt 12 that is supported for movement along a conveyor frame 14. In the embodiment shown in FIG. 2, the conveyor belt 12 has an indeterminate width that can be selected depending upon the user requirements. In the embodiment shown in FIGS. 1 and 2, the conveyor belt 12 is a segmented conveyor belt formed from a series of plastic links 16 that are joined to each other by a flexible, pivoting connection. Each of the links 16 includes a top face surface 18 and an alignment tab 20 that extends from a bottom face of each of the links 16. In the embodiment shown in FIGS. 1 and 2, the conveyor belt 12 is shown schematically as a smooth section over a portion of the length of the conveyor belt rather than as individual link 16 for the ease of illustration. However, it should be understood that in the embodiment illustrated, the entire length of the conveyor belt 12 will be a series of joined links 16. Although a specific type of conveyor belt 12 is shown in the drawings, it should be understood that the conveyor belt 12 could be other types of belts, such as a fabric belt or other currently available alternatives.

As illustrated in FIG. 2, the conveyor belt 12 is an endless belt that includes an upper run 22 and a lower run 24 where the upper run 22 is moving in a first direction and the lower run 24 is moving in an opposite, second direction. The upper run 22 of the conveyor belt 12 moves along and is supported by a top surface 25 of the conveyor frame 14 while the conveyor belt 12 is moving in the first direction and the lower run 24 returns along a lower surface 27 of the conveyor frame 14 when the conveyor belt 12 is moving in a second direction.

The conveyor assembly 10 further includes a drive assembly 26 that imparts movement to the conveyor belt 12 during operation as will be described in greater detail below. The drive assembly 26 generally includes a drive roller 28 that is securely mounted to a drive shaft 30, as is illustrated in the section view of FIG. 9. The drive roller 28 engages conveyor belt over a portion of its outer surface at the transition between the top run and the bottom run of the conveyor belt such that rotation of the drive roller 28 imparts motion to the endless conveyor belt.

Referring back to FIGS. 1 and 2, the drive shaft 30 is connected to an electric drive motor 32 that can be operated to rotate the drive shaft 30. In the embodiment shown in FIGS. 1 and 2, the entire drive assembly 26, including the drive motor 32 and the drive roller 28, are located at a first end 34 of the conveyor assembly. At the first end 34, the conveyor belt 12 transitions between the upper run 22 and the lower run 24 in a manner as will be described in greater detail below.

Referring now to FIGS. 2 and 3, the conveyor assembly 10 includes a conveyor belt tensioner 36 that includes a generally enclosed housing 37 mounted below the conveyor frame 14 at the first end 34 of the conveyor assembly 10. The belt tensioner 36 is designed to introduce tension into the conveyor belt 12 while also allowing for stretching of the conveyor belt 12 during the lifetime of use. When a plastic conveyor belt is used, the conveyor belt stretches over time due to heavy loads, product temperatures or room temperature. In the embodiment shown in FIGS. 2 and 3, catenary sag is introduced into the conveyor belt at the first end of the conveyor frame between the upper run and the lower run to allow for the stretching that occurs in the conveyor belt and to allow for the smooth operation of the conveyor belt and to introduce tension into the conveyor belt. The belt tensioner 36 is located at the first end 34 of the conveyor assembly below the drive roller such that the conveyor belt can transition from the drive roller to the belt tensioner in the manner to be described in detail below.

Figure 6:
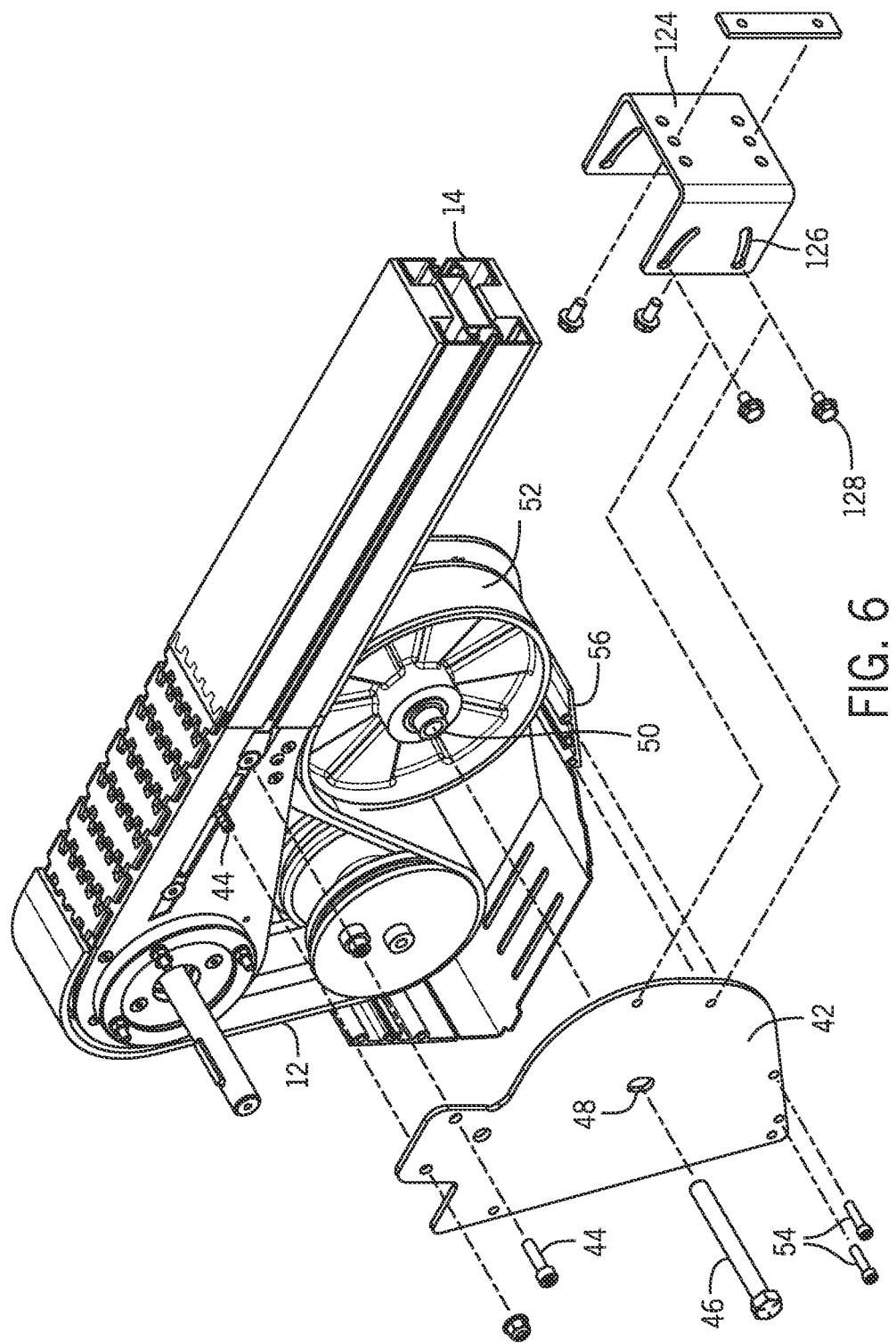
FIG. 6 is a further, partially exploded view of the drive assembly of the present disclosure.

The housing 37 of the belt tensioner 36 is partially defined by a pair of mounting plates 38 that are mounted to opposite sides of the conveyor frame. The mounting plates 38 in the embodiment shown are located on opposite sides of the conveyor frame and are each formed from two separate sections that can be separated from each other for both maintenance and installation. In the embodiment shown, the mounting plates 38 each include a tension roller support portion 40 and a guide roller support portion 42. Although the mounting plates 38 are shown in the embodiment as being composed of two separate support portions, it is contemplated that the mounting plate 38 could be a single component that would function in the same manner as will be described below. The mounting plates 38 are formed from sheet steel but other comparable materials could be used while operating within the scope of the present disclosure The guide roller support portion 42 is mounted to one side of the conveyor frame 14 by a pair of connectors 44, which is best shown in FIGS. 3 and 6. When the guide roller support portion 42 is securely attached and supported by the conveyor frame 14, a pivot rod 46 extends through a center opening 48 and passes through a center hub 50 of a guide roller 52. In this manner, the pivot rod 46 is able to rotatably support the guide roller 52 below the conveyor frame. A second pair of connectors 54 are used to support a lower guard 56 that forms the bottom of the housing to protect against contact between the operator and the moving conveyor belt 12.

Figure 5:
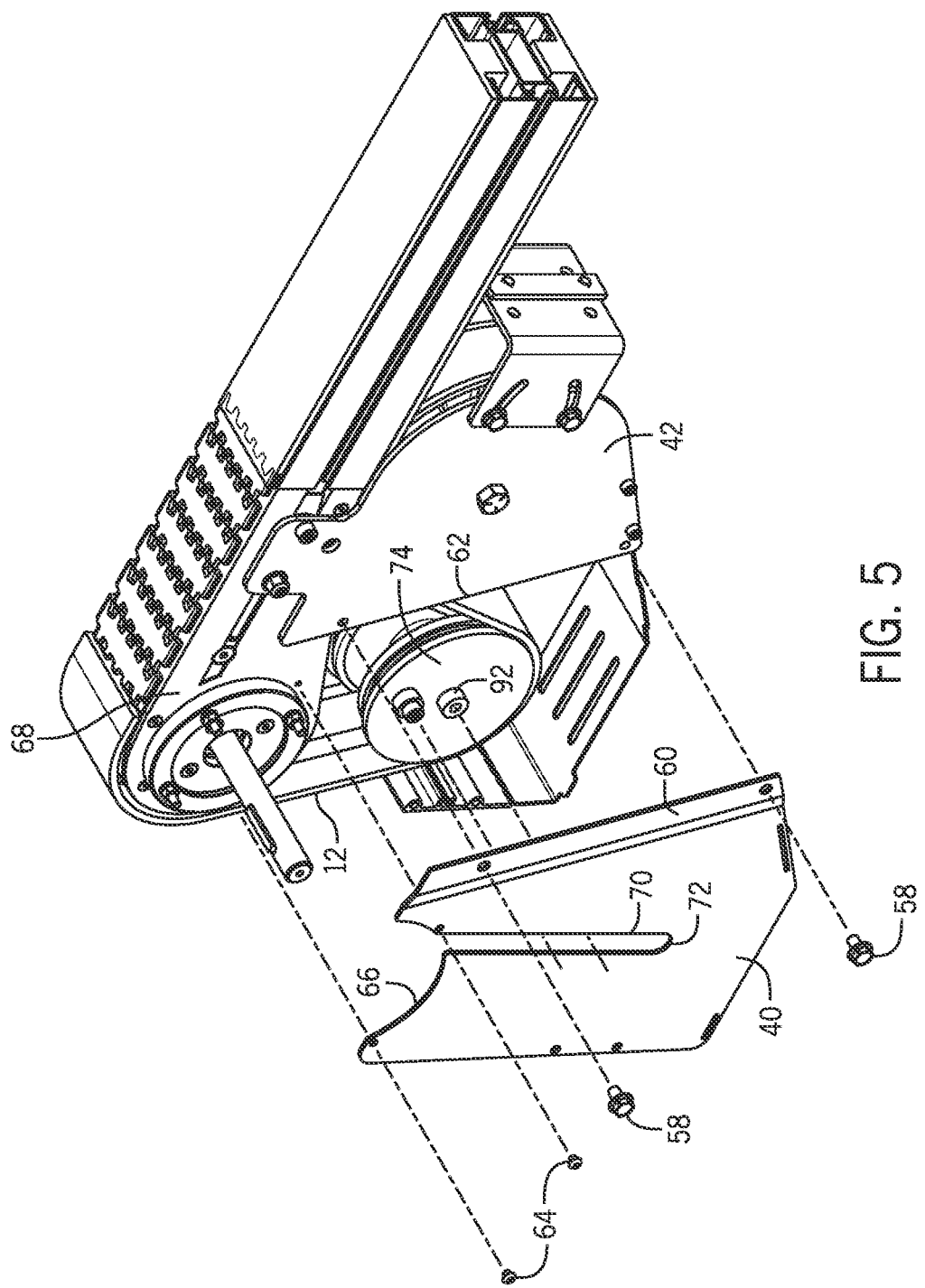
FIG. 5 is a further, partially exploded view of the drive assembly of the present disclosure.

Referring now to FIGS. 3 and 5, the tension roller support portion 40 of the mounting plates 38 is also securely connected to the conveyor frame and to the guide roller support portion 42. Specifically, a pair of connectors 58 attach a front portion 60 of the tension roller support portion 40 to a back edge 62 of the guide roller support portion 42. Another pair of connectors 64 attach an upper edge 66 of the tension roller support portion 40 to a drive roller support plate 68 that is mounted to one side of the conveyor frame. The tension roller support portion 40 includes a guide slot 70 that extends from the upper edge 66 of the tension roller support portion 40 to a bottom end 72. The guide slot 70 allows for vertical movement of a tension roller 74 in a manner as will be described in greater detail below. The tension roller 74 is shown in FIG. 5 as being supported within the catenary sag portion of the conveyor belt 12. In the embodiment illustrated, the tension roller 74 is a weighted roller that introduces tension into the conveyor belt 12 at the first end of the conveyor frame.

Referring back to FIGS. 3 and 4, the belt tensioner 36 further includes movement limiting assembly 75 that includes a stationary ratchet plate 76 and a movable ratchet member 78 that are each positioned in contact with a face surface 80 of the tension roller support portion 40. The stationary ratchet plate 76 is attached to the tension roller support portion 40 by a pair of connectors 82. In this manner, the stationary ratchet plate 76 is held in position, as shown in FIG. 3. The stationary ratchet plate 76 includes a first set of teeth 84 that are generally aligned in a vertical direction. Each of the teeth 84 is angled downward such that the first set of teeth 84 allow movement of the movable ratchet member 78 in only a first, downward direction. The movable ratchet member 78 includes a second set of teeth 86 that are located along an engagement edge 88. Each of the teeth of the second set of teeth 86 are angled in an opposite, upward direction relative to the first set of teeth 84. In this manner, the movable ratchet member 78 is only able to move downward relative to the stationary ratchet plate 76 and upward movement is restricted unless the movable ratchet member 78 is manually pivoted in a direction shown by arrow 90 in FIG. 3. The orientation and the weight of the movable ratchet member 78 biases the movable ratchet member 78 into engagement with the stationary ratchet plate 76, as shown in FIG. 3.

Figure 4:
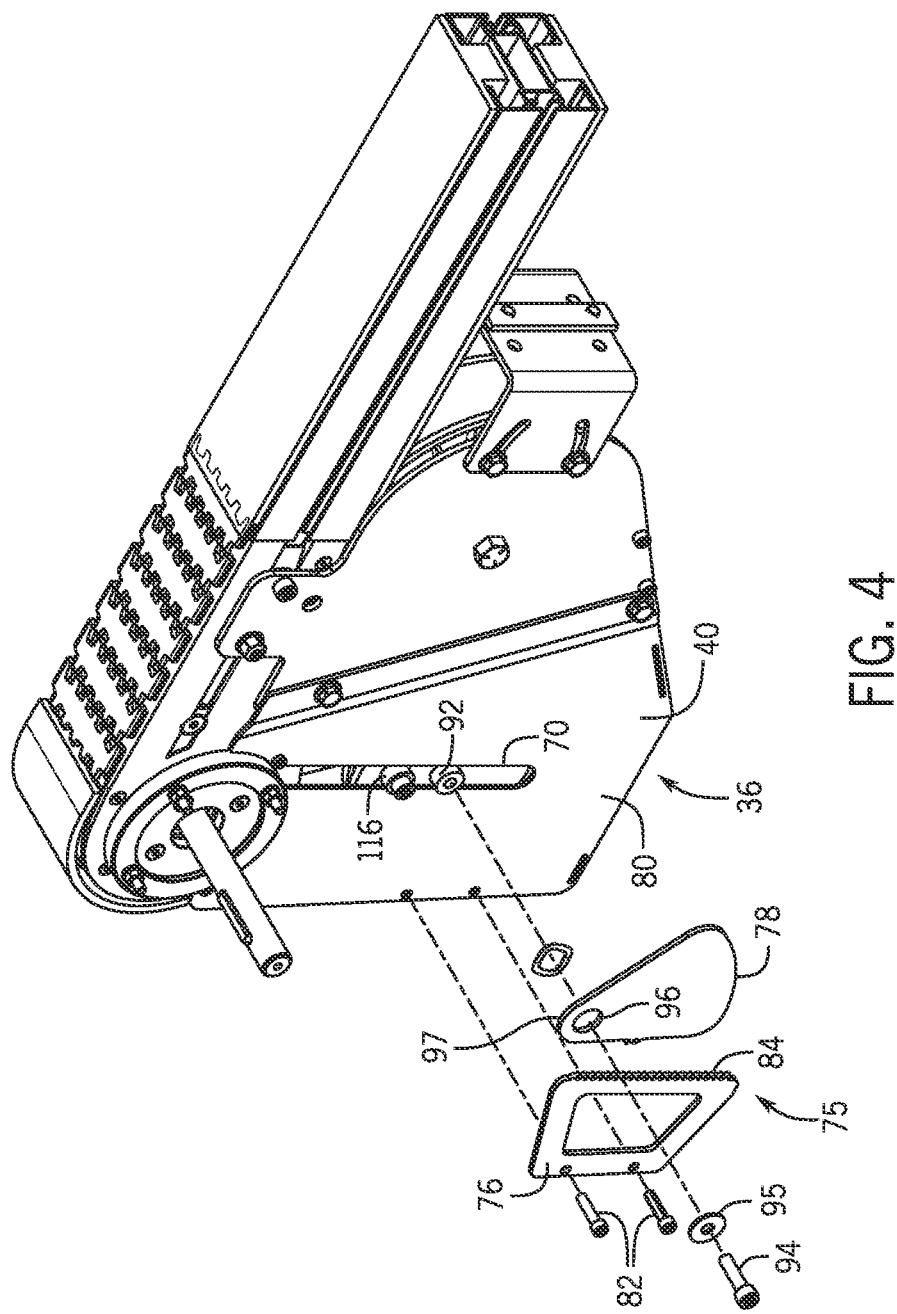
FIG. 4 is a partially exploded view of a portion of the drive assembly of the present disclosure.

Referring back to FIG. 5, the tension roller 74 includes a center hub 92. As shown in FIG. 4, a pivot pin 94 extends through a washer 95 and an upper opening 96 formed at an upper end 97 of the movable ratchet member 78. The end of the pivot pin 94 is received within a center opening in the center hub 92 of the tension roller 74. In this manner, the movable ratchet member 78 can pivot in a direction shown by arrow 90 in FIG. 3 as the tension roller 74 moves downward. However, the interaction between the first and second set of teeth prevent upward movement of the tension roller as described. If the tension roller needs to be released for servicing or any other reason, the movable ratchet member 78 can be manually pivoted in the direction shown by arrow 90 such that the first and second set of teeth are moved out of engagement with each other.

Figure 7:
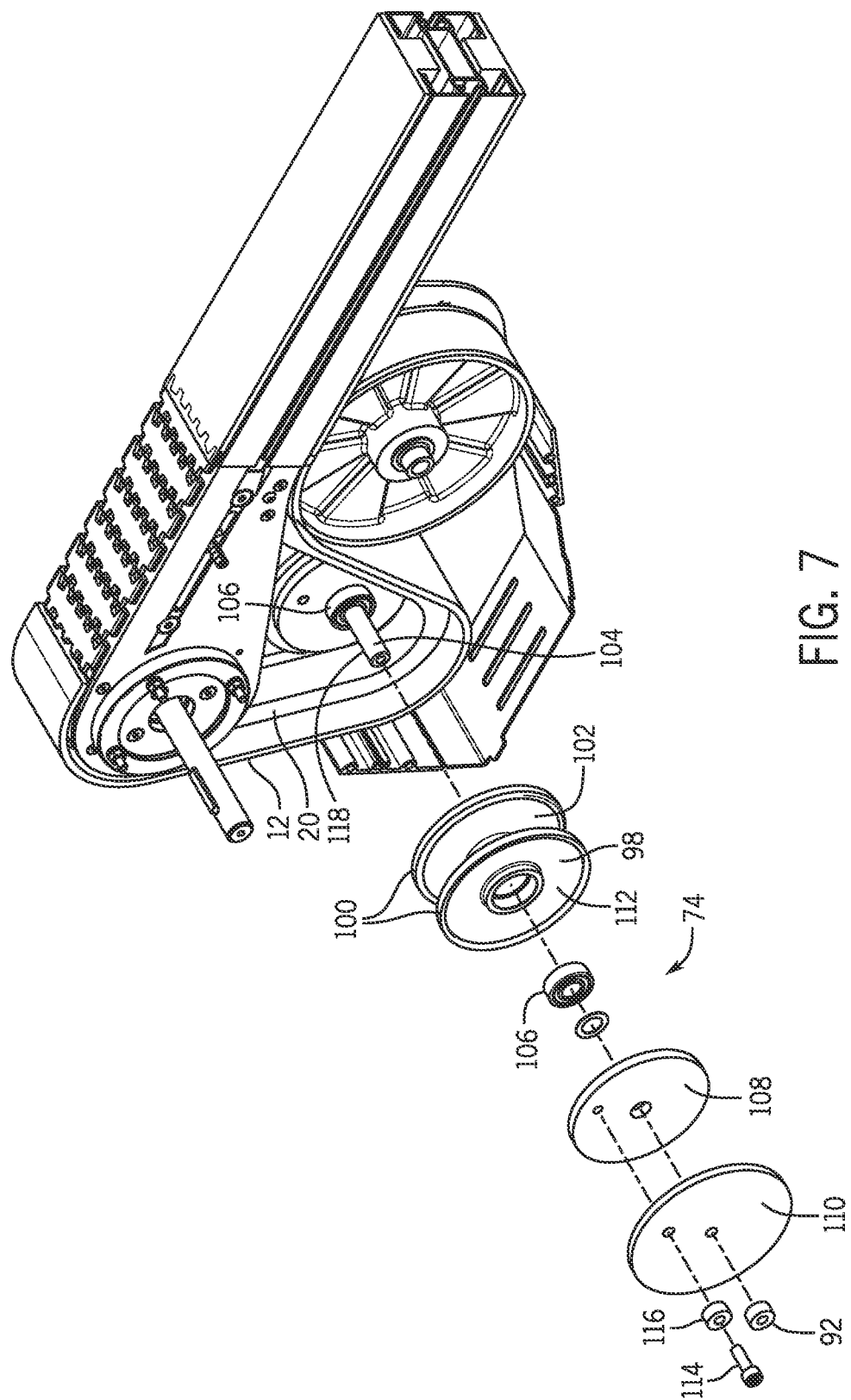
FIG. 7 is an exploded view of the tension roller of the drive assembly.

Referring now to FIG. 7, the details of the tension roller 74 are shown in the exploded view. The tension roller 74 generally includes a roller body 98 that has a pair of end portions 100 that are spaced by a center channel 102. The center channel 102 is designed to receive the alignment tab formed on the back surface of the conveyor belt 12 as is schematically illustrated by reference numeral 20 in FIG. 7. In this manner, the center channel 102 is able to guide the catenary sag portion of the conveyor belt 12 around at least a portion of the outer surface of the roller body 98 during operation of the conveyor belt.

The roller body 98 is rotatably supported about a support shaft 104 by a pair of bearings 106. The bearings 106 allow the roller body 98 to rotate relative to a weight plate 108 and mounting plate 110 that are each positioned adjacent to an outer face 112 of one of the end portions 100. In this manner, the roller body 98 can freely rotate while both the weight plate 108 and the mounting plate 110 are restricted from rotation.

In the embodiment illustrated, the weight plates 108 are formed from a relatively dense metal material that increases the weight of the entire tension roller 74. The weight plates 108 have a thickness that also aids in increasing the overall weight of the tension roller 74. In addition to the weight plates 108, the mounting plates 110 are also included as part of the tension roller 74. The mounting plates 110 can be formed from a less dense metal material or from plastic. The mounting plate 110 has an outer diameter that is slightly larger than the outer diameter of the weight plate 108 such that the outer edge of the mounting plate 110 extends past the outer edge of the weight plate 108.

As shown in FIG. 7, the mounting plate 110 is securely attached to the weight plate by a connector 114 that extends through a guide hub 116. The guide hub 116 has an outer diameter that is selected such that the guide hub 116 generally fits within the width of the guide slot 70, as shown in FIG. 3. The interaction between the guide hub 116 and the side walls that define the guide slot 70 prevents rotation of the mounting plate 110 while allowing the guide hub 116 to move vertically in the guide slot 70.

Referring back to FIG. 7, the center hub 92 is designed to receive an outer end 118 of the support shaft 104. Again as shown in FIG. 4, the center hub 92 is sized such that it can be freely movable in a vertical direction within the guide slot 70. In this manner, both the guide hub 116 and the center hub 92 guide the vertical movement of the tension roller within the overall length of the guide slot 70.

Figure 8:
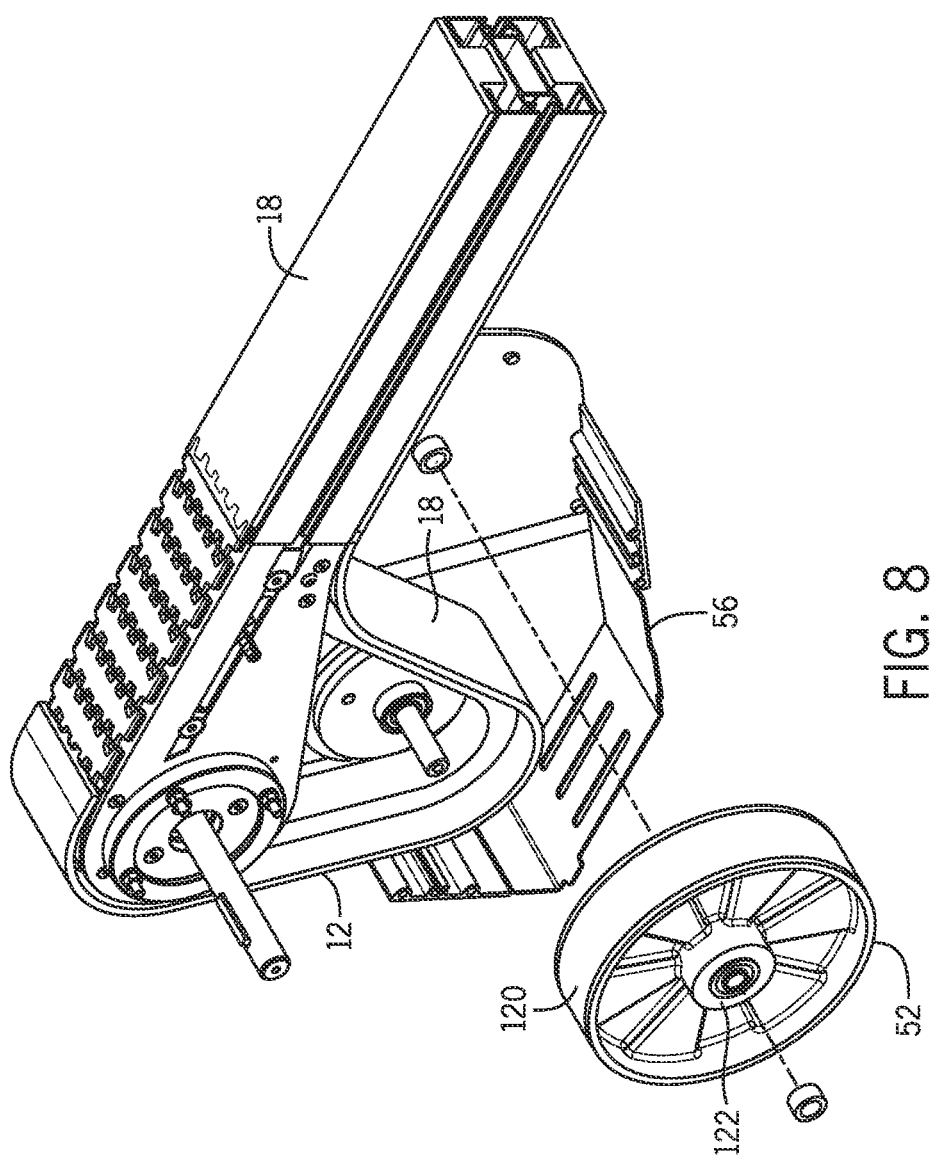
FIG. 8 is an exploded view of the guide roller of the drive assembly.

FIG. 8 illustrates the removal and the overall configuration of the guide roller 52. The guide roller 52 includes an outer surface 120 that is designed to contact the top face 18 of the conveyor belt 12 as the conveyor belt 12 moves over the guide roller 52, as can be seen in FIG. 7. The top face 18 of the conveyor belt 12 is generally smooth and passes over the generally smooth outer surface 120 of the guide roller 52. The guide roller 52 includes a center hub 122 that receives an internal bearing that allows the entire guide roller 52 to rotate about the pivot rod 46 shown in FIG. 6. In this manner, the guide roller 52 is rotatably supported between the pair of spaced mounting plates.

Referring now to FIG. 6, the belt tensioner 36 further includes a front mounting bracket 124 that can be used to connect the first end of the conveyor assembly to a support post (not shown) such that the conveyor assembly can be mounted to a floor. The support post extending above the floor mounts to the back side of the mounting bracket 124. The angular slots 126 and connectors 128 are used to adjust the angle of mounting of the conveyor assembly. In this manner, the conveyor can be mounted at up to a 30 degree incline/decline angle. Since the weighted tension roller controls the catenary in the conveyor belt, such flexibility in the incline/decline of the conveyor is possible as compared to a standard catenary conveyor in which the conveyor must be mounted up to 5 degrees of incline/decline relative to horizontal.

Figure 9:
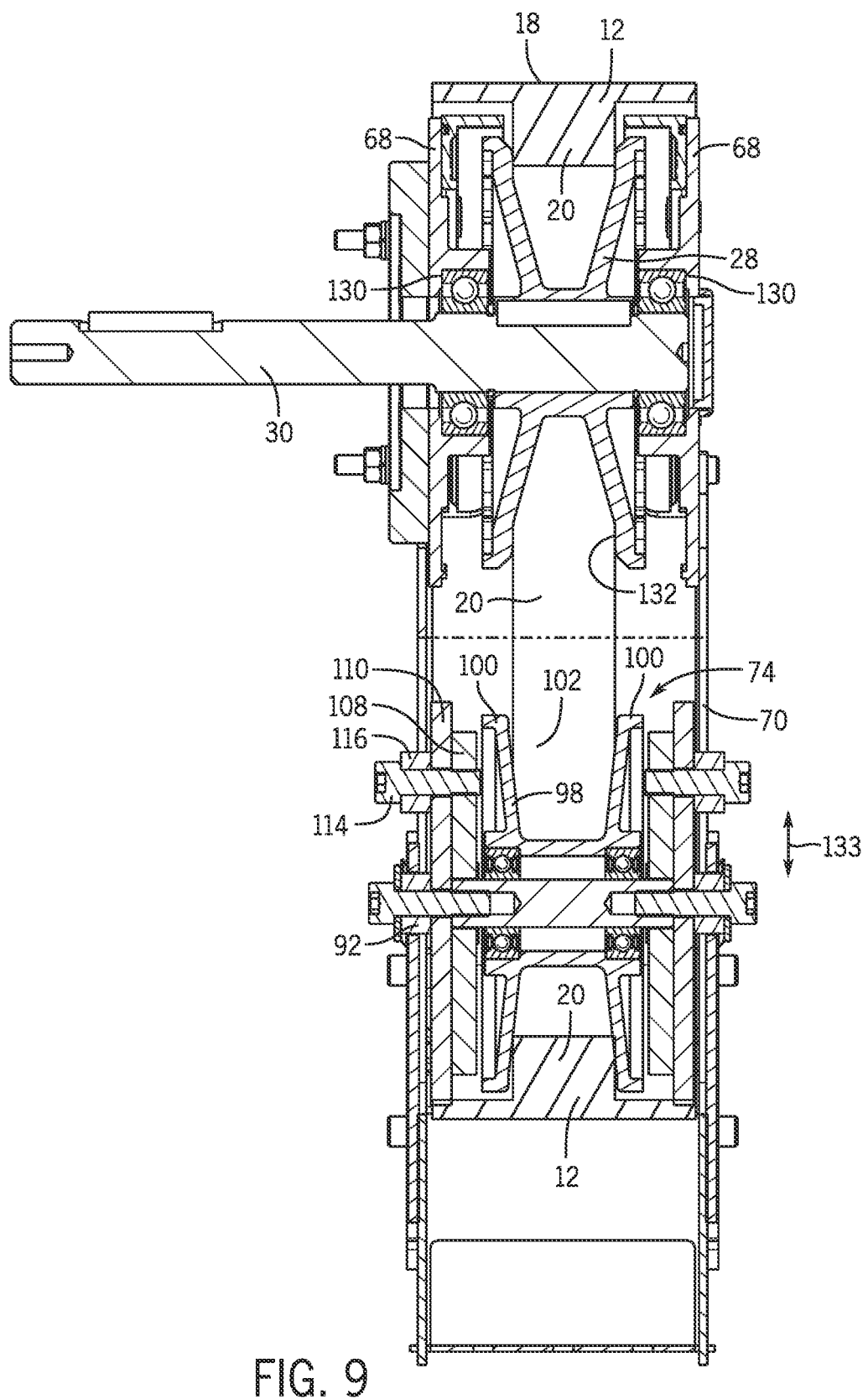
FIG. 9 is a section view taken along line 9-9 of FIG. 3.

FIG. 9 is a section view taken along line 9-9 of FIG. 3 and shows the specific mounting arrangement between the drive roller 28 and the tension roller 74. As was indicated previously, the drive roller 28 is rotatably supported to a drive roller support plate 68 mounted to each side of the conveyor frame. A pair of spaced bearings 130 allow the drive shaft 30 and the joined drive roller 28 to freely rotate relative to the stationary drive roller support plates 68. As shown in FIG. 9, the alignment tab 20 formed on the back surface of the conveyor belt 12 is received within a center channel 132 such that the conveyor belt can travel over a portion of the outer surface of the drive roller 28.

As shown in FIG. 9, the tension roller 74 is located vertically below the drive roller 28 and slightly offset toward the center of the conveyor frame. As described previously, the tension roller 74 includes a main body 98 that includes the end portions 100. The end portions 100 each are located adjacent to one of a pair of weight plates 108 and the mounting plates 110. Both the center hub 92 and the guide hub 116 are received within the guide channel 70 which allows the entire tension roller 74 to move vertically as indicated by arrow 133. Like the drive roller 28, the center channel 102 receives the alignment tab that extends from the back face of the conveyor belt 12 such that the tension roller can receive the conveyor belt 12 around at least a portion of the outer surface of the tension roller. Since the tension roller 74 is positioned downstream from the drive roller, the conveyor belt 12 exits contact with the drive roller and enters into contact with the tension roller 74. As was described in greater detail previously, the tension roller 74 includes a pair of weight plates 108 that increase the overall weight of the tension roller. The overall weight of the tension roller exerts a tension force due to gravity on the conveyor belt 12 as the conveyor belt passes over at least a portion of the outer surface of the tension roller 74. In this manner, the tension roller 74 introduces tension into the conveyor belt in the catenary sag portion of the conveyor belt.

Figure 10:
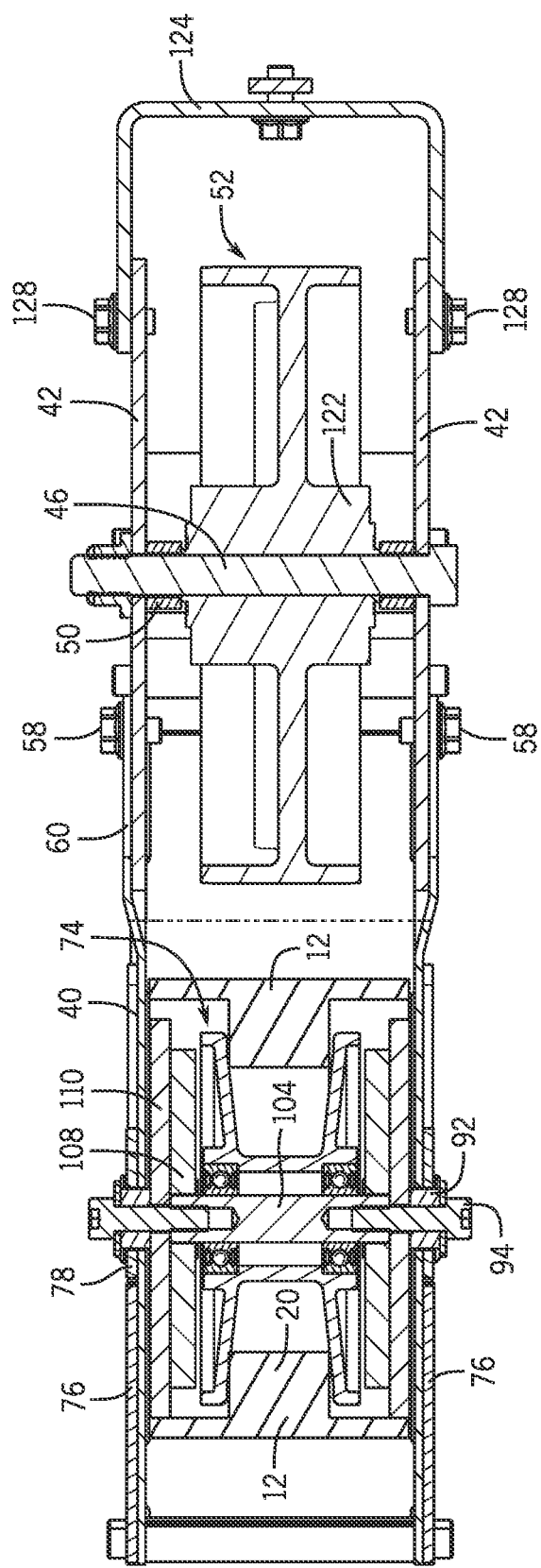
FIG. 10 is a section view taken along line 10-10 of FIG. 3.

FIG. 10 is another section view taken along line 10-10 of FIG. 3 and illustrates the position of the guide roller 52 relative to the tension roller 74. As illustrated in FIG. 10, the conveyor belt 12 passes over a substantial portion of the tension roller within the catenary sag portion of the conveyor belt. FIG. 10 also illustrates the interaction between the stationary ratchet plate 76 and the movable ratchet plate 78. This interaction, as described previously, prevents the upward movement of the tension roller 74 while allowing for downward movement of the tension roller. This is particularly important since during use of the conveyor belt, the overall length of the conveyor belt may increase due to stretching of the conveyor belt. In order to maintain proper tensioning on the conveyor belt, the weighted tension roller 74 exerts a downward force on the conveyor belt in the catenary sag section. Thus, as the conveyor belt stretches, the weighted tension roller 74 will move downward within the guide slot 70 shown in FIG. 3. This downward movement will continue over extended use of the conveyor assembly such that the overall weight of the tension roller will introduce the proper tension force into the conveyor belt.

Figure 11A:
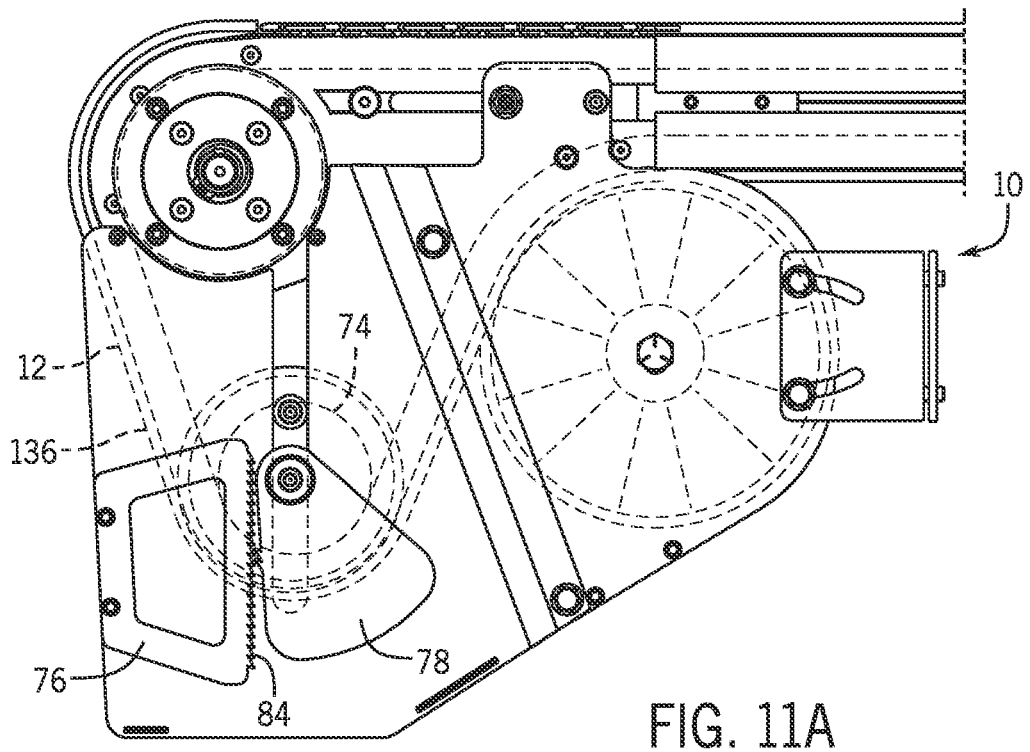
FIG. 11A is a side view showing a first position of the tension roller.

FIG. 11A illustrates the position of the tension roller 74 during the initial set up and use of the conveyor assembly 10. In this position, the tension roller 74 is located within the catenary sag portion 136 of the conveyor belt 12. As described previously, the overall weight of the tension roller 74 creates tension in the conveyor belt 12 within the catenary sag section 134. As can be seen in FIG. 11A, a substantial portion of the conveyor belt 12 passes over an outer surface of the tension roller 74 such that the tension roller 74 can exert a tension force against a relatively large surface area of the conveyor belt 12. In this position, the second set of teeth on the movable ratchet member 78 engage the first set of teeth 84 on the stationary ratchet plate 76. The interaction between the first and second set of teeth on the ratchet plates prevents the tension roller 74 from moving upward, such as may happen if all of the items being moved by the conveyor belt were removed or upon some other condition that may exist on the conveyor belt.

Figure 11B:
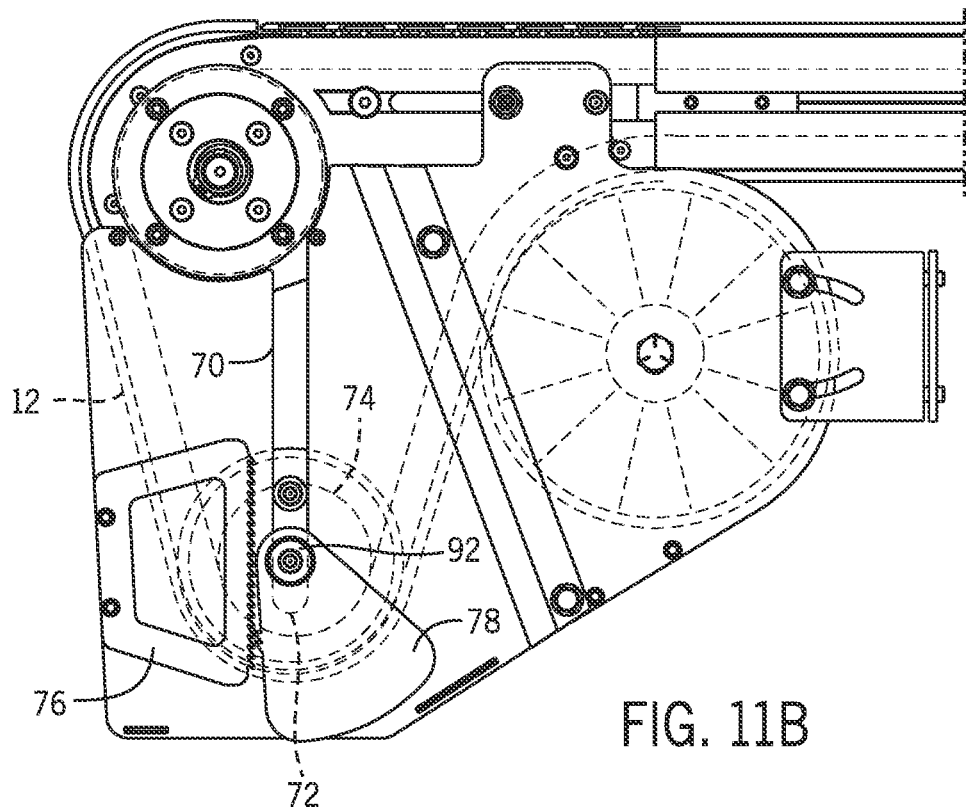
FIG. 11B is a side view showing a second position of the tension roller.

Referring now to FIG. 11B, after extended use of the conveyor assembly, the conveyor belt 12 will begin to stretch. When the conveyor belt 12 stretches, the overall weight of the tension roller 74 will urge the tension roller 74 to move in a vertically downward direction as can be seen in the comparison of FIGS. 11A and 11B. As can be seen in FIG. 11B, the movable ratchet member 78 has moved vertically downward relative to the stationary ratchet plate 76. In the position shown in FIG. 11B, the center hub 92 has nearly reached the bottom end 72 of the guide slot 70. Thus, only slightly additional vertical movement of the tension roller 74 is possible from the position shown in FIG. 11B. If the conveyor belt continues to stretch, the conveyor belt will either need to be replaced or other adjustments made since the tension roller 74 can only move downward until it contacts the bottom end 72.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A drive assembly for a conveyor including a conveyor frame extending between a first end and a second end to support a driven conveyor belt having an upper run and a lower run and moving in a conveying direction, comprising:
    a drive roller positioned at the first end of the conveyor frame to receive the conveyor belt around at least a portion of its outer surface;
    a drive motor coupled to the drive roller to rotate the drive roller and move the conveyor belt in the conveying direction;
    a tension roller positioned below the drive roller to receive the conveyor belt around at least a portion of an outer surface of the tension roller after the conveyor belt leaves contact with the drive roller, wherein the tension roller is freely movable in a vertical direction such that a weight of the tension roller imparts tension into the conveyor belt;
    a guide roller positioned to receive the conveyor belt around at least a portion of an outer surface of the guide roller after the conveyor belt leaves contact with the tension roller; and
    a pair of mounting plates each mounted to opposite sides of the conveyor frame, each of the mounting plates including a guide slot that receives a guide member mounted to the tension roller, wherein the tension roller and the guide roller are rotatably mounted between the pair of mounting plates.

2. The drive assembly of claim 1 wherein the tension roller includes a roller body and a weight element attached to the roller body.

3. The drive assembly of claim 2 wherein the weight element includes a pair of weight plates attached to first and second ends of the roller body.

4. The drive assembly of claim 1 wherein the tension roller is positioned in a catenary sag section of the lower run of the conveyor belt after the drive roller.

5. A drive assembly for a conveyor including a conveyor frame extending between a first end and a second end to support a driven conveyor belt having an upper run and a lower run and moving in a conveying direction, comprising:
    a drive roller positioned at the first end of the conveyor frame to receive the conveyor belt around at least a portion of its outer surface;
    a drive motor coupled to the drive roller to rotate the drive roller and move the conveyor belt in the conveying direction;
    a tension roller positioned below the drive roller to receive the conveyor belt around at least a portion of an outer surface of the tension roller after the conveyor belt leaves contact with the drive roller, wherein the tension roller is freely movable in a vertical direction such that a weight of the tension roller imparts tension into the conveyor belt;
    a guide roller positioned to receive the conveyor belt around at least a portion of an outer surface of the guide roller after the conveyor belt leaves contact with the tension roller;
    a pair of mounting plates each mounted to opposite sides of the conveyor frame, wherein the tension roller and the guide roller are rotatably mounted between the pair of mounting plates; and
    a stationary ratchet member having a first set of teeth and a movable ratchet member mounted to the tension roller and having a second set of teeth, wherein the first and second set of teeth are oriented to allow relative movement of the stationary ratchet member and the movable ratchet member in only one direction.

6. The drive assembly of claim 5 wherein each of the mounting plates includes a guide slot that receives a guide member mounted to the tension roller.

7. The drive assembly of claim 5 wherein the stationary ratchet member is mounted to one of the mounting plates.

8. The drive assembly of claim 5 wherein the movable ratchet member is rotatably mounted to the tension roller such that the movable ratchet member is movable with the tension roller and is rotatable relative to the tension roller.

9. A conveyor assembly comprising:
a conveyor frame extending between a first end and a second end;
a drive roller positioned at the first end of the conveyor frame to receive the conveyor belt around at least a portion of its outer surface;
a drive motor coupled to the drive roller to rotate the drive roller;
a conveyor belt having an upper run and a lower run and movable in a conveying direction by rotation of the drive roller, the conveyor belt including a catenary sag section in the lower run after the conveyor belt leaves contact with the drive roller;
a tension roller positioned in the catenary sag section of the conveyor belt such that the conveyor belt in in contact with at least a portion of an outer surface of the tension roller, wherein the tension roller is freely movable in a vertical direction such that a weight of the tension roller imparts tension to the conveyor belt;
a guide roller positioned to receive the conveyor belt around at least a portion of an outer surface of the guide roller after the conveyor belt leaves contact with the tension roller; and
a pair of mounting plates each mounted to opposite sides of the conveyor frame, each of the mounting plates including a guide slot that receives a guide member mounted to the tension roller, wherein the tension roller and the guide roller are rotatably mounted between the pair of mounting plates.

10. The conveyor assembly of claim 9 wherein the tension roller includes a roller body and a weight element attached to the roller body.

11. The conveyor assembly of claim 10 wherein the weight element includes a pair of weight plates attached to first and second ends of the roller body.

12. A conveyor assembly comprising:
a conveyor frame extending between a first end and a second end;
a drive roller positioned at the first end of the conveyor frame to receive the conveyor belt around at least a portion of its outer surface;
a drive motor coupled to the drive roller to rotate the drive roller;
a conveyor belt having an upper run and a lower run and movable in a conveying direction by rotation of the drive roller, the conveyor belt including a catenary sag section in the lower run after the conveyor belt leaves contact with the drive roller;
a tension roller positioned in the catenary sag section of the conveyor belt such that the conveyor belt in in contact with at least a portion of an outer surface of the tension roller, wherein the tension roller is freely movable in a vertical direction such that a weight of the tension roller imparts tension to the conveyor belt;
a guide roller positioned to receive the conveyor belt around at least a portion of an outer surface of the guide roller after the conveyor belt leaves contact with the tension roller;
a pair of mounting plates each mounted to opposite sides of the conveyor frame, wherein the tension roller and the guide roller are rotatably mounted between the pair of mounting plates; and
a stationary ratchet member having a first set of teeth and a movable ratchet member mounted to the tension roller and having a second set of teeth, wherein the first and second set of teeth are oriented to allow relative movement of the stationary ratchet member and the movable ratchet member in only one direction.

13. The conveyor assembly of claim 12 wherein each of the mounting plates includes a guide slot that receives a guide member mounted to the tension roller.

14. The conveyor assembly of claim 12 wherein the stationary ratchet member is mounted to one of the mounting plates.

15. The conveyor assembly of claim 12 wherein the movable ratchet member is rotatably mounted to the tension roller such that the movable ratchet member is movable with the tension roller and is rotatable relative to the tension roller.

* * * * *